United States Patent [19]

Sandberg et al.

[11] Patent Number: 4,790,966

[45] Date of Patent: Dec. 13, 1988

[54] METHOD FOR FORMING A PALLET WITH DEEP DRAWN LEGS

[75] Inventors: L. Bogue Sandberg, Chassell; Bruce A. Haataja, Lake Linden; Douglas C. Jurmu, Laurium; Robert D. Palardy, Houghton; Frank H. Story, Dollar Bay; William A. Yates, Calumet, all of Mich.

[73] Assignee: Board of Control of Michigan Technological University, Houghton, Mich.

[21] Appl. No.: 879,937

[22] Filed: Jun. 30, 1986

[51] Int. Cl.⁴ ........................ B29C 43/34; D04H 1/44

[52] U.S. Cl. ........................ 264/39; 264/108; 264/113; 264/119; 264/DIG. 57; 108/51.1; 108/901; 428/326

[58] Field of Search ............... 264/113, 108, 109, 112, 264/119, 292, 39, 101, DIG. 57, 517; 428/106, 326; 108/51.1, 53.1, 53.3, 53.5, 51.3, 901

[56] References Cited

U.S. PATENT DOCUMENTS

| | | | |
|---|---|---|---|
| 4,061,813 | 12/1977 | Geimer | 108/51.1 |
| 4,073,851 | 2/1978 | Munk | 264/109 |
| 4,078,030 | 3/1978 | Munk | 264/109 |
| 4,084,996 | 4/1978 | Wheeler | 264/119 |
| 4,131,664 | 12/1978 | Flowers | 264/113 |
| 4,131,705 | 12/1978 | Kubinsky | 264/113 |
| 4,241,133 | 12/1980 | Lund | 428/326 |
| 4,267,137 | 5/1981 | Smith | 264/113 |
| 4,364,984 | 12/1982 | Wentworth | 264/113 |
| 4,385,564 | 5/1983 | Heggenstaller | 264/112 |
| 4,440,708 | 4/1984 | Haataja et al. | 264/109 |
| 4,454,940 | 6/1984 | Ufermann | 264/113 |
| 4,469,216 | 9/1984 | Haataja et al. | 198/382 |
| 4,470,498 | 9/1984 | Lund et al. | 198/382 |
| 4,559,194 | 12/1985 | Heggenstaller | 264/113 |

*Primary Examiner*—James Lowe
*Assistant Examiner*—Jeremiah F. Durkin, II
*Attorney, Agent, or Firm*—Michael, Best & Friedrich

[57] ABSTRACT

A method for molding articles such as pallets from flake-like wood particles mixed with binder, the pallets housing a deck and integral molding legs. A loosely fitted mat of wood flakes is formed by depositing a first plurality of layers of wood flakes onto a supporting surface with a flake aligners provided for causing alignment of those flakes which will form legs of the pallet. A second plurality of layers are formed with a flake aligner provided for causing alignment of flakes which will form the legs of the pallet and in a direction transverse to the direction of alignment of the flakes of the first layers.

10 Claims, 4 Drawing Sheets

METHOD FOR FORMING A PALLET WITH DEEP DRAWN LEGS

FIELD OF THE INVENTION

The present invention relates to construction of molded wood particle products such as pallets used for material handling and to methods and apparatus for use in making such molded wood products.

BACKGROUND PRIOR ART

Due to the increasing expense of wood and lumber, efforts have been made to construct a pallet of the type for use in material handling from alternative materials such as wood chips, wood pulp and wood particles.

Examples of pallets comprised of composite wood material are illustrated in the Coughey et al. U.S. Pat. No. 4,248,163 issued Feb. 3, 1981; and the Haataja U.S. Pat. No. 4,408,544 issued Oct. 11, 1983, assigned to the assignee of the present invention.

A method for molding articles such as wood pallets from loosely felted mats of wood flakes is also illustrated in the Haataja U.S. Pat. No. 4,440,708, issued Apr. 3, 1984 and in the Haataja U.S. Pat. No. 4,337,710, issued July 6, 1982. Those patents illustrate a method and apparatus for molding composite wood flake pallets wherein a loosely felted mat of wood flakes is positioned on a lower press die. The loosely felted mat is comprised of elongated thin wood flakes with the flakes lying in horizontal planes and with the flakes having a random orientation in those planes. The die includes a plurality of cavities which form the integral downwardly extending legs of the pallet. Male die members of an upper die extrude the mat material down into the cavities in the lower die during compression of the mat to form the legs of the pallet.

During the compression of the mat, the wood flake material in the area of the die cavities forming the legs is extruded downwardly into the cavities. In applications where the legs are relatively long, there is substantial extrusion of the mat material into the die cavities, and in some applications, the mat material may be pulled apart to form voids in the compressed mat, and in some applications these voids result in localized weaknesses in the pallet.

SUMMARY OF THE INVENTION

The present invention is directed to an improved method and apparatus for forming a pallet comprised of compressed wood particles of the type wherein a loosely felted mat of wood flakes mixed with a binder is placed between dies in a press and compressed to form a load supporting deck and hollow legs extending downwardly from the deck, the legs being formed integrally with the deck. The method and apparatus of the invention provides an improved means for forming the legs of the pallet, particularly where the legs are sufficiently long that a relatively deep draw of the mat material is required to form the legs.

In one embodiment of the invention, the method includes the steps of providing a caul sheet having a configuration conforming to the desired configuration of the lower press die and being adapted to be placed in the press and supported by the lower press die during compression of the pallet. The method includes a first step of filling the cavities of the caul sheet with wood flakes. A first layer of the loosely felted mat is then deposited onto the caul sheet, with the wood flakes of at least these portions of the first layer located above the leg cavities being aligned generally parallel to one another. A second layer of the mat is then formed with at least the wood flakes of these portions of the second layer located above the leg cavities being aligned in generally parallel relation wtth respect to one another and extending generally transversely to the aligned wood flakes of the first layer.

When the wood flakes comprising the mat are aligned in this manner, during the pressing operation wherein the wood flakes are forced into the die cavities to form the pallet legs, the formation of voids is prevented.

In one embodiment of the invention wood flakes can be deposited directly into the die cavities of the lower die plate. The remainder of the loosely felted mat, and including the layers of the aligned wood flakes, can be formed on a flat caul sheet and can then be transferred onto the lower die plate.

In one preferred embodiment of the invention, the apparatus for use in forming the mats includes a conventional mat former adapted to drop uniform loosely felted layers of wood flakes onto a supporting surface or caul sheet. A structure is provided for positioning the caul sheet beneath the mat former and for causing reciprocal movement of the caul sheet beneath the mat former. During each pass of the caul sheet beneath the mat former a thin layer of wood flakes is deposited onto the caul sheet. During the initial formation of the mat, a first alignment structure is placed on the caul sheet and is moved with the caul sheet beneath the mat former. This alignment structure includes a rectangular frame of approximately the same size as the caul sheet and includes a plurality of parallel baffle plates positioned in vertical orientation and in parallel spaced apart side-by-side relation. The baffle plates are aligned with the direction of movement of the caul sheet and are positioned at opposite sides of the caul sheet and above the areas of the mat which will form the legs of the pallet. This flake aligner is positioned on the caul sheet during a first predetermined number of passes of the caul sheet beneath the former. The first flake aligner is then removed, and a second flake aligner is positioned on the caul sheet. This second flake aligner includes a plurality of baffle plates supported above the openings of the caul sheet to define the leg cavities. This second flake aligner includes baffles which are vertically oriented and supported in spaced apart relation and defining planes perpendicular to the direction of alignment of the first set of baffle plates of the first flake aligner. The second flake aligner is supported on the caul sheet for a second predetermined number of passes beneath the mat former. Subsequently, the second flake aligner is removed from the caul sheet and then the caul sheet is moved back and forth beneath the mat former to form the remaining layers of wood flake material forming the mat.

Various features and advantages of the invention will be apparent by reference to the following description of a preferred embodiment, from the drawings and from the claims.

Figure 7:
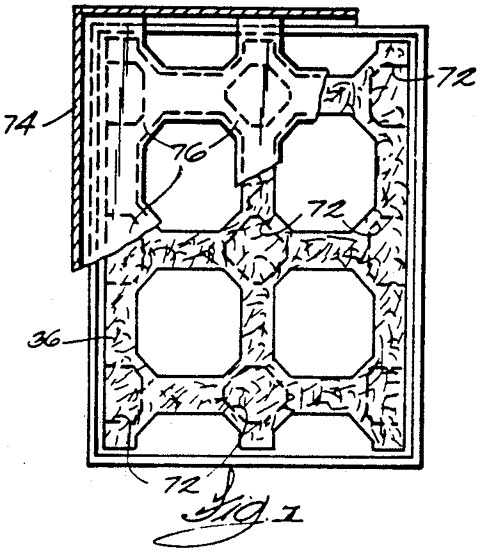
FIG. 7 is a plan view of a caul sheet of the type illustrated in FIG. 4 and having flakes deposited in the leg cacities of the caul sheet.

Before describing the invention in detail, it is to be understood that the invention is not limited in its application to the details of construction and to the arrangement of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF THE PREFERRED EMBODIMENTS

The invention relates broadly to articles, particularly support members, including a main body having a major plane and non-planar portions displaced from that major plane, both molded as a one-piece unit from wood flakes. The invention is particularly adaptable to construction of material handling pallets and will be described in connection therewith.

Figure 1:
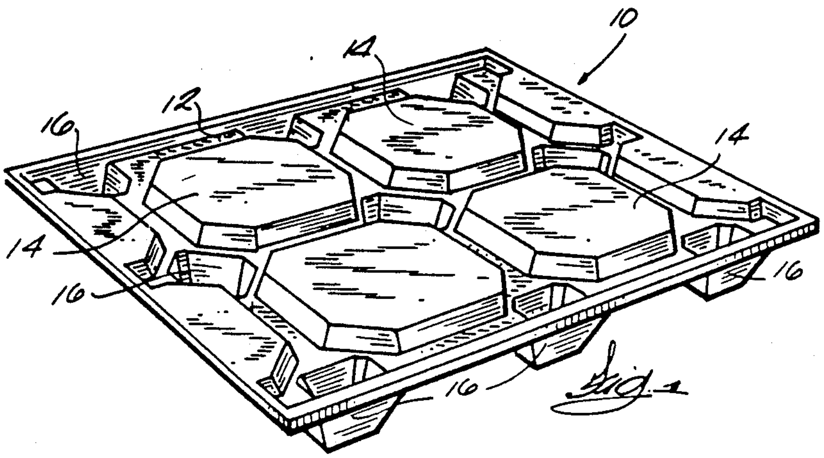
FIG. 1 is perspective view of molded wood flake pallet manufactured using a method and apparatus embodying the invention.
Figure 2:
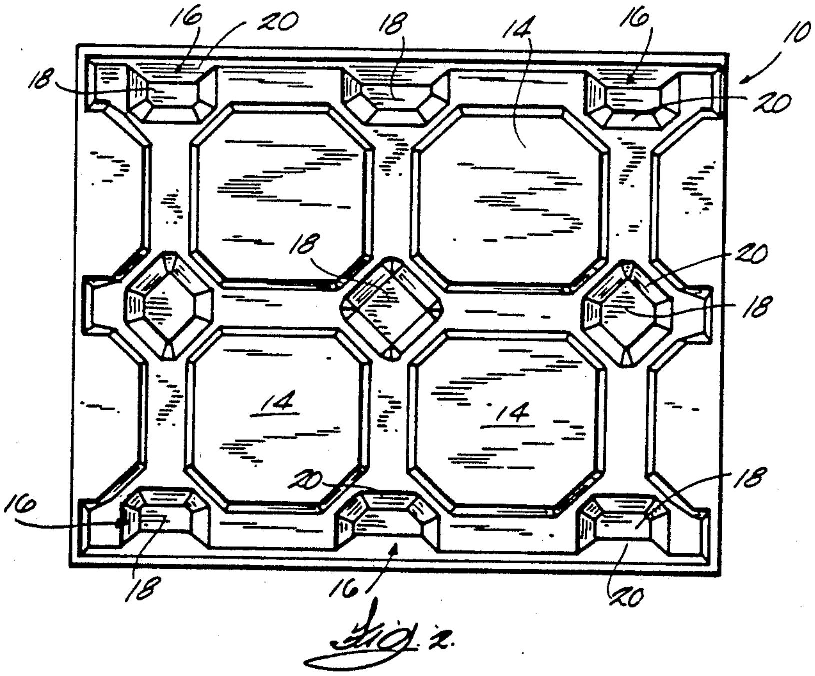
FIG. 2 is a plan view of the pallet illustrated in FIG. 1.
Figure 3:
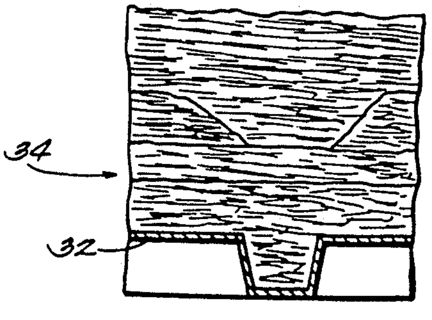
FIG. 3 is a partial cross section view of a caul sheet supporting a loosely felted mat of wood flakes to be compressed to form the pallet illustrated in FIG. 1.

Illustrated in FIG. 1 is a pallet 10 including a rectangular deck 12 having a substantially uniform thickness and flat upper surfaces 14 which serve as supporting planes for a load to be placed on the pallet. Projecting downwardly from the deck 12 are a plurality, e.g. nine, hollow leg members 16 adapted to serve as supporting pads for the pallet 10. In the specific construction illustrated, each of the leg members 16 includes a bottom wall 18 having a flat bottom surface and two opposed pairs of flat sidewalls 20. The bottom surface of the bottom wall 18 is spaced from the underneath surface of the deck 12 a sufficient distance to permit entry of tines of a forklift beneath the deck 12.

The deck 12 and legs 16 are molded as a one-piece unit from a mixture of a suitable resinous particle board binder and flakelike wood particles as will be described below. The sidewalls 20 of the legs 16 are inclined or tapered to facilitate molding and also to permit nesting of several pallets 10 into a compact stack so as to minimize the space required for shipment and storage. In the specific construction illustrated, the sidewalls 20 are substantially flat, and the legs have the general form of an inverted truncated hollow pyramid.

Manufacturing a pallet from wood particles includes the steps of comminuting small logs, branches or rough pulp wood into flake-like particles, drying the wood flakes to a predetermined moisture content, classifying the dried flakes to obtain wood particles having a predetermined size, blending predetermined quantities of a suitable resinous particle board binder and optionally a liquid wax composition with the dried and sized flakes, forming the resultant mixture of binder, wax and wood flakes into a loosely felted, layered mat, placing the mat in an open mold or press including separable male and female dies defining a mold chamber having the desired shape of the pallet, closing the mold and applying sufficient pressure to the mat to compress it into substantially the desired shape and size of the pallet, removing the molded pallet from the press and trimming the peripheral edges of the pallet with a power saw or the like to the desired final dimensions.

The wood flakes used can be prepared from various species of suitable hardwoods and softwoods used in the manufacture of particle board. Representative examples of suitable woods include aspen, maple, oak, elm, balsam, fir, pine, cedar, spruce, locust, beech, birch and mixtures thereof.

In a preferred form of the invention the wood flakes will comprise aspen species, Populus Tremuloides or Grandidentata. The wood should be purchased in pulp wood log form, commonly four inches in diameter and larger than 100 inches long or longer.

Suitable wood flakes can be prepared by various conventional techniques. In a preferred form of the invention, pulp wood grade logs are converted into wood flakes by a conventional round wood flaker.

The size distribution of the flakes is important, particularly the length and thickness. The wood flakes should have a target or mean flake size of approximately 0.20 inches thick by 0.50 inches wide by 2.0 to 3.0 inches long. In any given batch, some of the flakes can be shorter or longer than the target flake size so long as the overall average length is within the above range. The same is true for the thickness.

While the flake size can be controlled to a large degree during the flaking operation as described above, it usually is necessary to use some sort of classification in order to remove undesirable particles, both undersized and oversized, and thereby insure the average length, thickness and width of the flakes within the desired ranges.

Flakes from some green wood can contain up to 90% moisture content. The moisture content of the mat must be substantially less than this for molding as discussed below. Also, wet flakes tend to stick together and complicate classification and handling prior to blending. Accordingly, the flakes are preferably dried prior to classification in a conventional type dryer, such as a tunnel dryer, to the moisture content desired for the blending step. The moisture content to which the flakes are dried usually is on the order of about seven weight percent or less based on the dry weight of the flakes.

A known amount of the dried classified flakes is introduced into a conventional blender, such as a drum type blender, wherein predetermined amounts of a resinous particle binder, and optionally a wax and other additives, is applied to the flakes as they are tumbled or agitated in the blender. Suitable binders include those used in the manufacture of particle board and similar pressed fibrous products and, thus, are broadly referred to herein as "resinous particle board binders." In one form of the invention an adhesive binder comprising Modur E441 Polyisocyanate, manufactured by Mobay Chemical Co., is applied at a rate of 8 percent and wax comprising Casco Wax EW 403-E, manufactured by Borden Chemical Co., is applied at a rate of 2 percent of the oven dry wood weight.

The furnish or blended wood flakes and binder is deposited by a mat former or dispensing system 30 (FIG. 5) onto a caul plate 32 to form a loosely felted mat of wood flake material. In the illustrated arrangement, the mat former 30 includes a hopper 34 adapted to contain a quantity of furnish 36 comprised of the wood flakes mixed with binder. A conveyor belt 38 having a horizontal upper flight 40 is positioned beneath the hopper 34 and one or more picker wheels 42 are provided at the bottom of the hopper 34 to cause furnish to be metered through an opening 44 in the bottom of the hopper in a loosely dispersed state onto the upper flight 40 of the conveyor belt. The furnish is conveyed by the conveyor belt 38 from the hopper to the discharge end 39 of the conveyor belt where it is deposited as a thin curtain 46 of loosely blended wood flakes.

Figure 5:
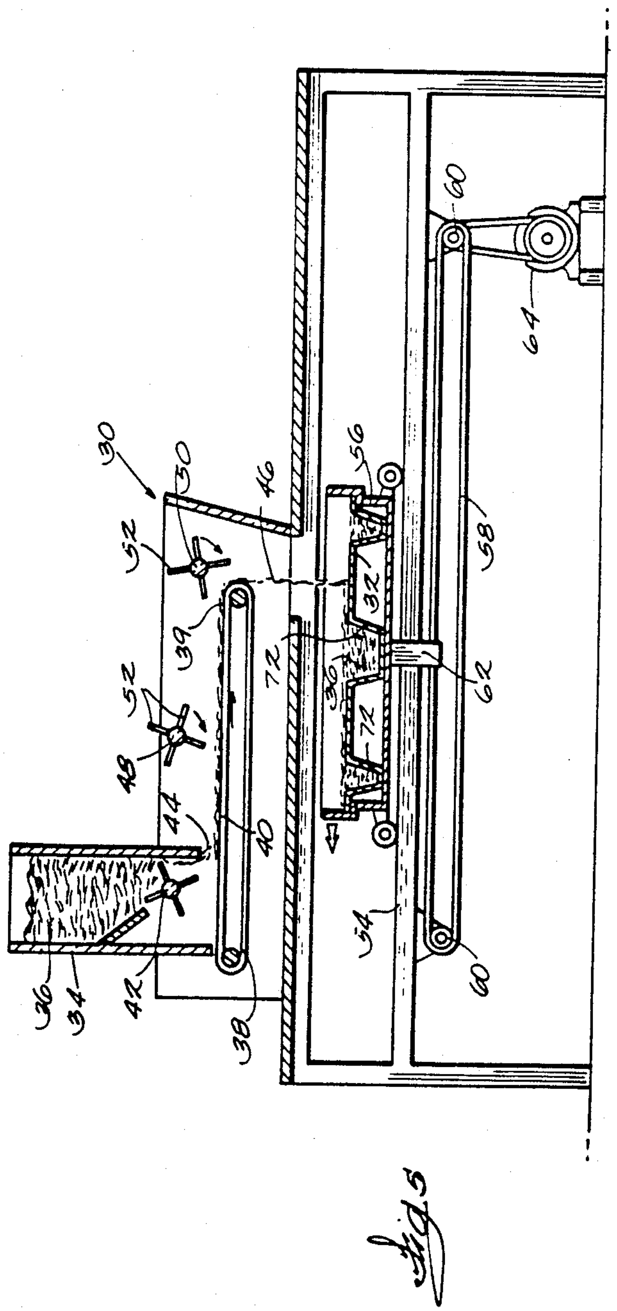
FIG. 5 is a side elevation view partially in section illustrating a mat former employed in the method embodying the invention.

A plurality of picker wheels 48 and 50 are also provided between the hopper 34 and the discharge end 39 of the conveyor belt for maintaining the furnish in a loosely dispersed state on the upper belt flight 40 and to provide for an even distribution of the flakes in a thin uniform layer across the width of the belt. The picker wheels 48 and 50 are positioned immediately above the upper flight of the belt and include radially extending fingers 52 adapted to engage the furnish as the picker wheels 48 and 50 are rotated. The picker wheels are rotated in a clockwise direction as seen in FIG. 5 such that the downwardly extending ends of the fingers 52 move in a direction opposite to the direction of the upper flight 40 of the conveyor 38.

In the illustrated arrangement, means are also provided for supporting the caul plate 32 beneath the discharge end 39 of the conveyor belt 38 such that the caul plate 32 can be reciprocated back and forth beneath the discharge end 39 of the conveyor and such that uniform thin layers of wood flakes will be deposited on the caul plate 32 as it is moved back and forth. As the flakes drop onto the caul plate, they will become oriented such that they will lie in horizontal planes and in interweaved loosely felted relation.

While various means could be provided for supporting the caul plate 32 for movement back and forth beneath the end of the conveyor, in the illustrated arrangement a track 54 is provided for supporting a wheeled cart 56, and the cart 56 in turn supports the caul plate 32 in horizontal relation. Means are also provided for causing reciprocal movement of the cart 56. While various means could be used to cause movement of the cart beneath the end 39 of the conveyor, in the illustrated construction that means includes a cable 58 reeved over a pair of pulleys 60 and connected to the cart 56 by a connecting structure 62, the connecting structure 62 being fixed to the cart 56 and being fixed to the cable 58. The cable 58 is driven by a reversing electric motor 64.

In one embodiment of the invention, the loosely felted mat is built up by passing the caul plate 32 at a uniform rate beneath the discharge end 39 of the conveyor a total of 16 passes, and the furnish is deposited on the caul sheet 16 in even layers at the rate of three pounds per pass to form a mat having a thickness of approximately 6 inches.

Figure 4:
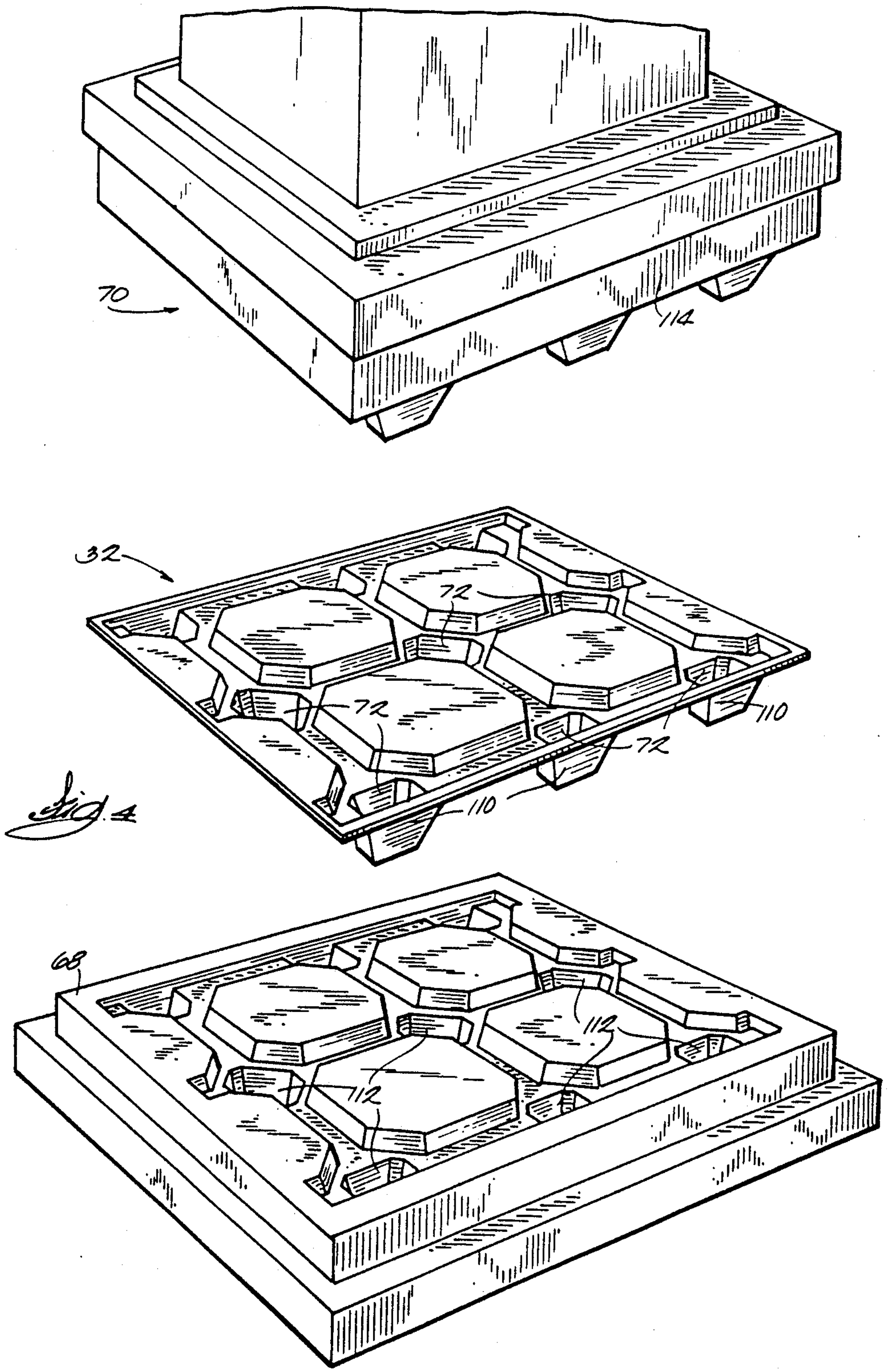
FIG. 4 is an exploded perspective view of a press and caul sheet used in manufacturing the pallet illustrated in FIG. 1.
Figure 6:
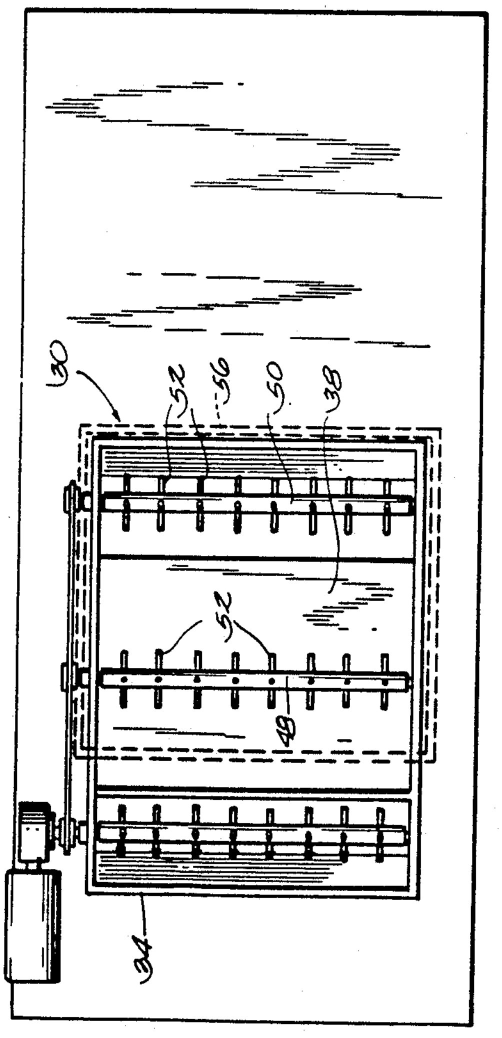
FIG. 6 is a plan view of the mat former illustrated in FIG. 5.

In the illustrated arrangement, the caul plate 32 will have a configuration as illustrated in FIG. 4 and defining the bottom of the pallet 10 to be formed, and the lower die 68 of the press 70 is constructed such that it can house the caul plate 32, with the caul plate 32 positioned directly in the lower die 68 during the pressing operation.

In one embodiment of the invention, the caul plate 32 can be moved back and forth beneath the discharge end 39 of the conveyor 38 until the leg cavities 72 of the caul plate 32 are filled with furnish. The caul plate 32 can then be removed from the carriage 56, and a vacuum mask 74 (FIG. 7) is positioned over the caul plate 32. The vacuum mask 74 includes a rectangular chamber or housing adapted to fit over the caul plate, and the housing is provided with a plurality of fixed plates 76 adapted to engage the upper surface of the caul plate to cover the leg cavities 72. The fixed plates 76 function to hold the wood flakes in the leg cavities in place. A vacuum hose (not shown) is connected to the housing 74 and functions to remove any wood flakes on the caul sheet 72 not secured in place by the fixed plates 76.

After the leg cavities 72 are filled with furnish, and the excess furnish is removed from the surface of the caul plate, the caul plate 32 is again placed on the carriage 56 for movement back and forth beneath the discharge end 39 of the conveyor belt.

Means are also provided for causing a first portion of the wood flakes deposited on the caul plate 32 to be aligned in parallel relation to each other, this first portion of the wood flakes being those flakes forming the portion of the loosely felted mat which will become the legs 16 of the molded pallet 10.

Figure 8:
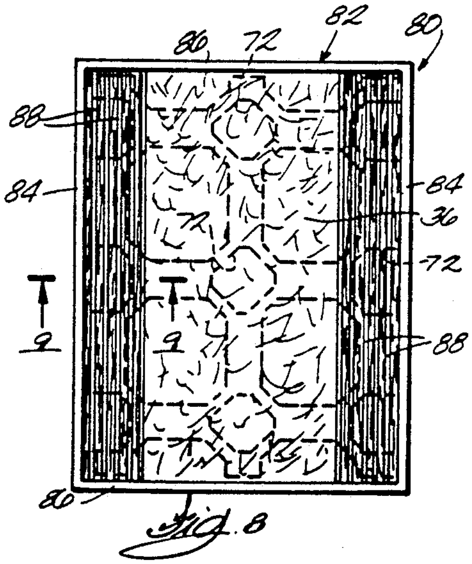
FIG. 8 is a view similar to FIG. 7 and showing a first flake aligner positioned on the caul sheet illustrated in FIG. 7.

In the illustrated construction this means for causing the flakes to be aligned includs a flake aligner 80 (FIGS. 8 and 9) supported above the caul plate 32 as the caul plate 32 moves back and forth under the mat former 30. The flake aligner 80 is comprised of a rigid rectangular frame 82 including side members 84 and end members 86, the frame 82 being open at the top and bottom. The frame 82 is positionable on the caul plate 32 or carriage 56 such that furnish can fall through the frame 82 onto the caul plate. The frame includes two sets of planar baffle plates 88 housed in the opening defined by the frame 82, one of the sets of baffle plates 88 being positioned over one row of leg cavities 72 of the caul sheet and the other set of baffle plates 88 being positioned above a second row of leg cavities 72 of the caul sheet. Each set of baffle plates 88 is comprised of a plurality of spaced apart thin sheet metal plates supported at their opposite ends by the end walls 86 of frame 82. The plates are spaced apart by a distance greater than the width of the widest flakes to be deposited on the caul sheet 32 but substantially less than the length of most of the flakes such that as the flakes fall from the discharge end 39 of the conveyor belt onto the moving caul sheet 32, the baffle plates will result in alignment of the flakes falling onto that area of the caul sheet 32 including the leg cavities 72. In one form of the invention, the baffle plates are spaced apart by approximately 1.5 inches.

Figure 9:
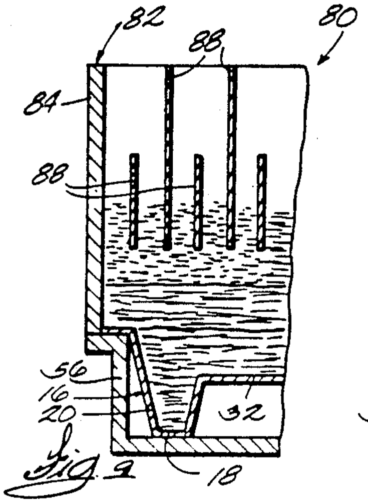
FIG. 9 is a cross section view taken along line 9—9 in FIG. 8.
Figure 11:
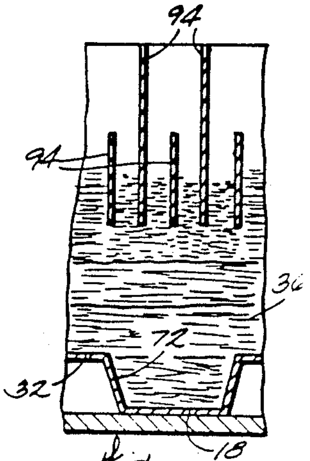
FIG. 11 is a cross section view taken along line 11—11 in FIG. 10.

As seen in FIG. 9, in a preferred form of the invention, the height of the baffle plates 88 is varied or staggered to prevent the flakes from lying across the baffle plates 88 and for causing the flakes to fall between the baffle plates so that they become aligned.

Figure 10:
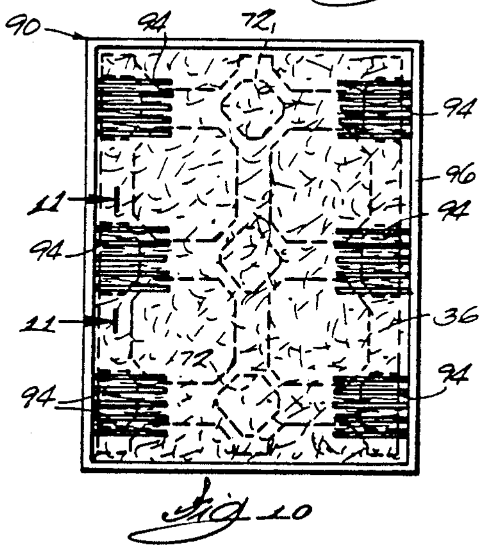
FIG. 10 is a view similar to FIG. 8 and showing a second flake aligner positioned on the caul sheet.
Figure 12:
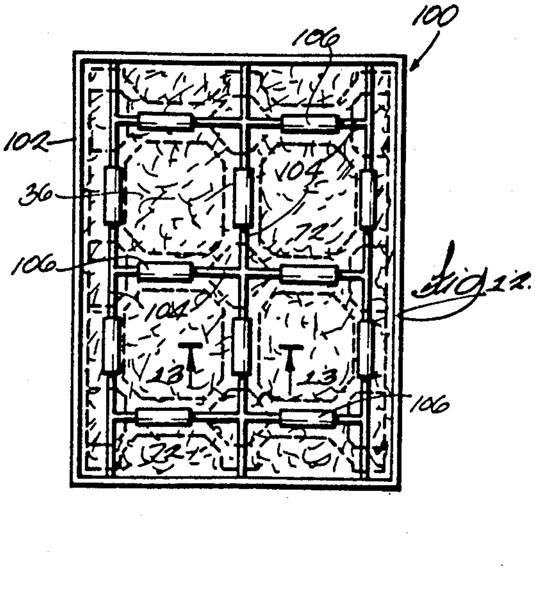
FIG. 12 is a view similar to FIGS. 8 and 10 and showing a flake diverter positioned on the caul sheet.
Figure 13:
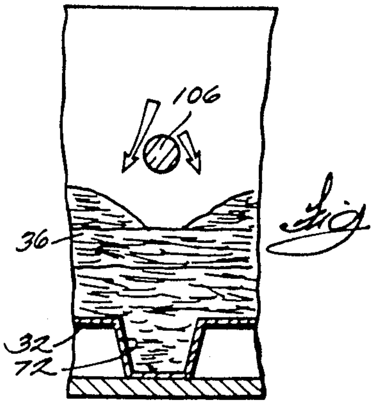
FIG. 13 is a cross section view taken along line 13—13 in FIG. 12.

In a preferred form of the invention the caul plate 32 having the flake aligner 80 positioned thereon will be moved beneath the mat former four times to form a first layer of wood flakes. The flake aligner 80 is then removed and a second flake aligner 90 (FIG. 10) is positioned above the caul plate 32. The second flake aligner 90 is intended to provide a means for causing a portion of the loosely felted flakes forming the next layer to be aligned in directions transverse to the direction of alignment of the wood flakes of the first layer. More particularly, the second flake aligner 90 includes a rectangular frame 92 similar to frame 82 and adapted to be positioned above the caul sheet 32 and to be supported by the carriage 56. The second flake aligner 90 also includes a plurality of sets of baffle plates 94, each set of baffle plates 94 including a plurality of baffle plates positioned in side-by-side spaced apart relation and extending inwardly from the sides 96 of the frame 92. The sets of baffle plates 94 are intended to be positioned above the leg cavities 72 of the caul sheet 32, and the aligned flakes of the first layer of flakes. In a preferred arrangement, the baffle plates 94 of the second flake aligner 90 have a staggered height to facilitate alignment of the flakes and to prevent the flakes from lying across two or more baffle plates. In a preferred form of the invention, the baffle plates 94 of the second flake aligner will be spaced apart approximately 1.5 inches.

In one embodiment of the invention, the caul plate 32 having the second flake aligner 90 thereon is moved back and forth beneath discharge end 39 of the conveyor belt 38 for eight passes to build up additional layers of wood flakes on the caul sheet 32.

The second flake aligner 90 is then removed and a third frame structure 100 is placed above the caul sheet 32 for the remainder of the passes under the mat former and until a mat having a thickness of approximately 6 inches is formed on the caul sheet. The third frame structure 100 includes a rectangular frame 102 like those of the first and second flake aligners, and further includes a plurality of intersecting rods 104 supported by the rectangular frame 102, the intersecting rods 104 supporting a plurality of cylinders 106 provided to cause the flakes falling onto the mat to be diverted away from areas of the mat. Diversion of flakes from these areas during formation of the top layers of the mat aids in molding of channels during the pressing operation.

Once the mat has been formed on the caul sheet 32, the caul sheet is positioned on the lower die plate 68 of the press with the legs 110 of the caul sheet 32 nested in complementary cavities 112 of the lower die plate 68. The loosely felted mat is compressed between the heated die plates 68 and 114 to form a densified product. The compressed pallet 10 is then removed from the press, and the edges of the pallet are trimmed as required to form straight sides on the pallet and to meet the dimensional requirements of the pallet.

In one preferred form of the invention, the dies are maintained at a temperature of approximately 350° or more during the pressing operation to provide for proper cure of the binder.

Due to the alignment of the layers of wood flakes used to form the pallet legs and by filling the caul plate cavities with additional furnish material, during the initial steps of depositing wood flakes onto the caul plate, during the pressing operation, a pallet having relatively long legs can be formed in a single stage compressing operation and without formation of tears or voids in the mat material during the pressing operation.

While in the illustrated arrangement the caul plate has a configuration complementing the configuration of the lower die plate, and is adapted to be inserted into the press during the molding operation, in other arrangements, furnish can be placed directly in the die cavities of the lower die plate and then the remainder of the loosely felted mat can be formed on a flat caul sheet with the wood flakes forming the mat being aligned in the same manner as described above. The caul sheet and mat are then placed between the dies of the press, and the caul sheet is stripped from the mat leaving the mat on the lower die plate.

In another embodiment of the invention, during the formation of the mat, a first layer or portion of the mat can contain aligned wood flakes in the areas to form the legs of the pallet. This portion of the mat can comprise approximately 25% of the mat thickness. The remainder of the mat can then be formed with randomly oriented wood flakes.

Various features of the invention are set forth in the following claims.

We claim:

1. A method for molding an article having a major plane and at least one non-planar portion displaced from the major plane, the method comprising the steps of:

providing flake-like wood particles;

admixing a resinous particle board binder into the wood particles;

depositing the mixture of wood particles and binder onto a support structure to form a loosely felted layered mat, the wood particles in the loosely felted layered mat lying substantially flat in planes generally parallel to the major plane of the mat, and said loosely felted layered mat including a first layer and a second layer supported by the first layer, and said wood particles in at least a portion of the first layer in the area of the mat to form the non-planar portion of the article being aligned in a first direction in substantially mutually parallel relation, and said wood particles in at least a portion of the second-layer in the area of the mat forming the non-planar portion being aligned in substantially mutually parallel relation in a second direction transverse to said first direction, positioning the loosely felted layered mat in an open press between spaced dies having the shape of the molded article being formed, and pressing the mat between the dies and applying sufficient heat and pressure to the mat to compress it into substantially the desired shape and size of the article to bond the wood particles together.

2. A method as set forth in claim 1 wherein the wood particles have an average length of about 2 to about 3 inches, an average thickness of about 0.2 inches and an average width of about 0.5 inches.

3. A method as set forth in claim 1 wherein the step of depositing the mixture of wood particles and binder onto a support structure includes the steps of:

positioning a first flake aligner above the support structure, the first flake aligner including a plurality of parallel spaced apart baffle plates, said baffle plates defining vertical planes, depositing wood flakes through said first flake aligner onto the support structure to form the first layer, the baffle plates causing said portion of the flakes of the first layer to be aligned in mutually parallel relation, removing the first flake aligner, positioning a second flake aligner above the support structure, the second flake aligner including a plurality of parallel spaced apart baffle plates, the baffle plates of the second flake aligner defining vertical planes transverse to the planes defined by the baffle plates of the first flake aligner, depositing wood flakes through the second flake aligner onto the first layer, the baffle plates of the second flake aligner aligning the portion of the wood flakes of the second layer transversely to the direction of alignment of the portion of the wood flakes of the first layer.

4. A method as set forth in claim 1 and further including the steps of providing a caul sheet adapted to form the support structure and adapted to be positioned between the dies and adapted to be supported by one of the press dies, the caul sheet having a flat surface for supporting the loosely felted mat of wood flakes and the caul sheet having a plurality of cavities for housing wood flakes to form the non-planar portions of the article.

5. A method as set forth in claim 4 and further including the step of filling the cavities in the caul sheet with wood flakes prior to forming the first layer.

6. A method for molding a pallet having a deck including a flat surface for supporting a load and a plurality of spaced apart legs integral with the deck and extending downwardly from the deck, the spaced apart legs being provided to support the deck, the method comprising the steps of:

forming a loosely felted mat of wood flakes mixed with a resinous particle board binder the loosely felted mat being adapted to be compressed in a press to form the molded pallet, the step of forming the loosely felted mat including the steps of providing a mat supporting surface having a flat surface and a plurality of cavities for forming the legs of the pallet, filling the plurality of cavities of the supporting surface with wood flakes, placing a first flake aligning device over the mat supporting surface, depositing a first portion of wood flakes mixed with the resinous particle board binder on said mat supporting surface to form a first layer of loosely felted wood flakes on said supporting surface, said wood flakes lying in horizontal planes, said first flake aligning device causing at least a portion of said wood flakes of said first layer to be aligned in generally mutually parallel alignment in a first direction, said portion of said first layer being above at least one of said cavities, removing said first flake aligning device, placing a second flake aligning device over the mat supporting surface, depositing a second loosely felted layer of wood flakes mixed with the resinous particle board binder onto said first layer of wood flakes, at least a portion of said second layer of wood flakes being aligned in mutually parallel alignment in a second direction, said portion of said second layer being deposited onto said portion of said wood flakes of said first layer, and said second direction being transverse to said first direction and compressing said loosely felted mat in a press to form a molded article, the aligned wood flakes of the first layer and the aligned wood flakes of the second layer forming the leg portions of the molded pallet.

7. A method as set forth in claim 6 and further including the steps of removing said second flake aligning device after said second loosely felted layer is deposited, and depositing a third layer of loosely felted flakes onto said second layer, the wood flakes of the third layer lying in horizontal planes and having random orientation in those planes.

8. A method as set forth in claim 6 wherein said first flake aligning device includes a plurality of parallel spaced apart baffle plates, said baffle plates defining vertical planes, wherein said second flake aligning device includes a plurality of parallel spaced apart baffle plates, the baffle plates of the second flake aligning device defining vertical planes transverse to the planes defined by the baffle plates of the first flake aligning device, and wherein said baffle plates of said first flake aligning device are positioned above at least a portion of said cavities of said supporting surface and wherein said baffle plates of said second flake aligning device are positioned above said cavities of said supporting surface.

9. A method as set forth in claim 6 and further including the step of providing a caul sheet, said caul sheet having an upper surface defining said supporting surface and said caul sheet having a configuration complementary to the configuration of at least one of the dies of the process such that said caul sheet can be housed in said one of said dies.

10. A method as set forth in claim 6 wherein said step of filling the cavities of the caul sheet includes the step of depositing a loosely felted mat of wood flakes onto said caul sheet to fill said cavities, positioning a vacuum device over said caul sheet and said loosely felted mat, and removing wood flakes from said caul sheet not housed in said cavities.

* * * * *